(12) United States Patent
Osuki

(10) Patent No.: US 11,716,434 B2
(45) Date of Patent: Aug. 1, 2023

(54) IMAGE PROCESSING APPARATUS, CONTROL METHOD OF IMAGE PROCESSING APPARATUS, AND STORAGE MEDIUM FOR TRANSMITTING IMAGE DATA FOR TRANSMITTING INPUT DATA AND SELECTED USER INFORMATION INDEPENDENT OF ACCOUNT INFORMATION

(71) Applicant: CANON KABUSHIKI KAISHA, Tokyo (JP)

(72) Inventor: Takashi Osuki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/175,118

(22) Filed: Feb. 12, 2021

(65) Prior Publication Data
US 2021/0266421 A1    Aug. 26, 2021

(30) Foreign Application Priority Data
Feb. 20, 2020    (JP) ................................ 2020-027619

(51) Int. Cl.
*H04N 1/32* (2006.01)
*H04N 1/00* (2006.01)
(Continued)

(52) U.S. Cl.
CPC ......... *H04N 1/32566* (2013.01); *H04L 67/54* (2022.05); *H04N 1/00217* (2013.01);
(Continued)

(58) Field of Classification Search
CPC .......... H04N 1/32566; H04N 1/00244; H04N 1/32406; H04N 1/00795; H04N 1/32101;
(Continued)

(56) References Cited

U.S. PATENT DOCUMENTS

2005/0174592 A1* 8/2005 Iinuma ............... H04N 1/00209
358/1.15
2007/0047697 A1* 3/2007 Drewry .................. H04M 11/00
379/88.13
(Continued)

FOREIGN PATENT DOCUMENTS

JP    2015-126318 A    7/2015

*Primary Examiner* — Nicholas Pachol
(74) *Attorney, Agent, or Firm* — Canon U.S.A., Inc. IP Division

(57) ABSTRACT

To enable identification of a user who has transmitted image data generated by scanning by an image processing apparatus, the image processing apparatus that communicates with a chat server that performs control, based on received information indicating a talk room of the chat server, to display information indicating received image data and transmission source user information indicating a user who has transmitted the image data on the talk room includes a reading unit configured to read an image of an original document and generate image data based on the image, a designation unit configured to designate a talk room of the chat server; and a transmission unit configured to transmit the image data generated by the reading unit, information indicating the talk room designated by the designation unit and the transmission source user information to the chat server.

23 Claims, 18 Drawing Sheets

(51) Int. Cl.
*H04L 67/54* (2022.01)
*H04L 67/02* (2022.01)

(52) U.S. Cl.
CPC ..... *H04N 1/00244* (2013.01); *H04N 1/00408* (2013.01); *H04N 1/00795* (2013.01); *H04N 1/32101* (2013.01); *H04N 1/32406* (2013.01); *H04L 67/02* (2013.01); *H04N 2201/0094* (2013.01); *H04N 2201/3205* (2013.01); *H04N 2201/3208* (2013.01); *H04N 2201/3223* (2013.01)

(58) Field of Classification Search
CPC .......... H04N 1/00408; H04N 1/00217; H04N 2201/3223; H04N 2201/0094; H04N 2201/3205; H04N 2201/3208; H04L 67/24

See application file for complete search history.

(56) References Cited

U.S. PATENT DOCUMENTS

| | | | |
|---|---|---|---|
| 2014/0039877 A1* | 2/2014 | Guenigault | G06F 40/10 704/9 |
| 2016/0050326 A1* | 2/2016 | Lee | H04N 1/00244 358/402 |
| 2016/0234135 A1* | 8/2016 | Kim | H04L 51/04 |
| 2017/0093774 A1* | 3/2017 | Arastafar | H04L 65/1069 |
| 2020/0099800 A1* | 3/2020 | Noguchi | H04N 1/32662 |
| 2021/0144266 A1* | 5/2021 | Tsukada | H04N 1/00464 |
| 2021/0160393 A1* | 5/2021 | Sugita | H04N 1/00217 |
| 2021/0195060 A1* | 6/2021 | Hasegawa | H04N 1/00411 |
| 2021/0195061 A1* | 6/2021 | Moriya | H04L 51/04 |

* cited by examiner

FIG.16

| DEVICE ID/USER ID | AUTHENTICATION INFORMATION (TOKEN) |
|---|---|
| user1 | xxTOKEN 1 |
| user2 | xxTOKEN 2 |
| user3 | xxTOKEN 3 |
| device1 | xxTOKEN 4 |
| device2 | xxTOKEN 5 |

IMAGE PROCESSING APPARATUS, CONTROL METHOD OF IMAGE PROCESSING APPARATUS, AND STORAGE MEDIUM FOR TRANSMITTING IMAGE DATA FOR TRANSMITTING INPUT DATA AND SELECTED USER INFORMATION INDEPENDENT OF ACCOUNT INFORMATION

BACKGROUND

Field of the Disclosure

The present disclosure relates to an image processing apparatus, a control method of the image processing apparatus, and a storage medium.

Description of the Related Art

Japanese Patent Application Laid-Open No. 2015-126318 discusses an image processing apparatus that transmits image data, which is generated by scanning an image of an original document, to a file server on a network to share the generated image data.

In a case where the image data is transmitted from the image processing apparatus to a chat service and the image data is displayed in a talk room of the chat service, it is conceivable that a user logs in to the chat service with the account of the image processing apparatus to transmit the image data.

In this case, while it is possible to display information about the image processing apparatus that has transmitted the image data as a transmission source of the image data, it is not possible to identify the user who has transmitted the image data even by seeing the talk room.

SUMMARY

The present disclosure has been made in consideration of the above issue, and embodiments of the disclosure are directed to identifying a user who has executed transmission of image data generated by scanning an image by an image processing apparatus.

According to embodiments of the present disclosure, an image processing apparatus that communicates with a chat server that performs control, based on received information indicating a talk room of the chat server, to display information indicating received image data and transmission source user information indicating a user who has transmitted the image data on the talk room includes a reading unit configured to read an image of an original document and generate image data based on the image, a designation unit configured to designate a talk room of the chat server, and a transmission unit configured to transmit the image data generated by the reading unit, information indicating the talk room designated by the designation unit and the transmission source user information to the chat server.

Further features of the present disclosure will become apparent from the following description of exemplary embodiments with reference to the attached drawings.

BRIEF DESCRIPTION OF THE DRAWINGS

FIG. 16 is a diagram illustrating an example of association of identification (ID) and token information.

DESCRIPTION OF THE EMBODIMENTS

Exemplary embodiments of the present disclosure will be described below with reference to the accompanying drawings. Configurations of the exemplary embodiments described below are merely examples, and the present disclosure is not limited to the illustrated configurations.

First Exemplary Embodiment

Figure 1:
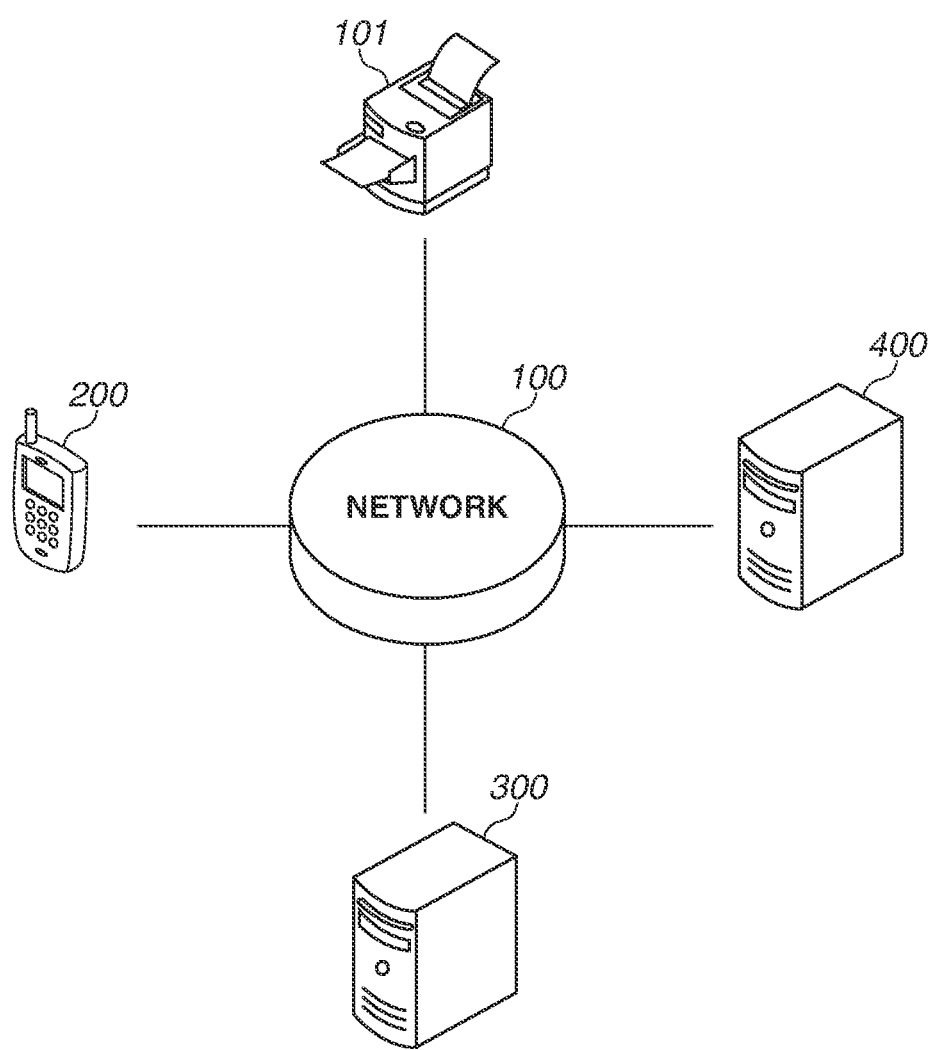
FIG. 1 is a diagram illustrating an example of a system configuration according to an exemplary embodiment of the present disclosure.

FIG. 1 is a diagram illustrating an example of a system configuration according to the present exemplary embodiment. The system configuration according to the present exemplary embodiment includes a mobile terminal 200, a multifunction peripheral (MFP) 101 and a message application server 300. The mobile terminal 200 is an example of a terminal apparatus. The MFP 101 is an image processing apparatus. The MFP 101 and the message application server 300 can communicate with the mobile terminal 200 via a network 100. A bot server 400 is also connected to the system via the network and capable of communicating therewith. The message application server 300 is a chat server that manages a chat service to receive a message and/or image data transmitted from the MFP 101 and the mobile terminal 200 and to display the message and/or the image data on the mobile terminal 200 or a personal computer (PC) (not illustrated) in response to a user operation. The bot server associates a request from the MFP 101 with information (token information) corresponding to a bot application installed in the message application server 300 connected to the MFP 101, and forwards the request to the message application server 300. The network 100 according to the present exemplary embodiment may be the Internet, or a local area network (LAN). The network 100 may be a wired network or a wireless network.

Figure 2:
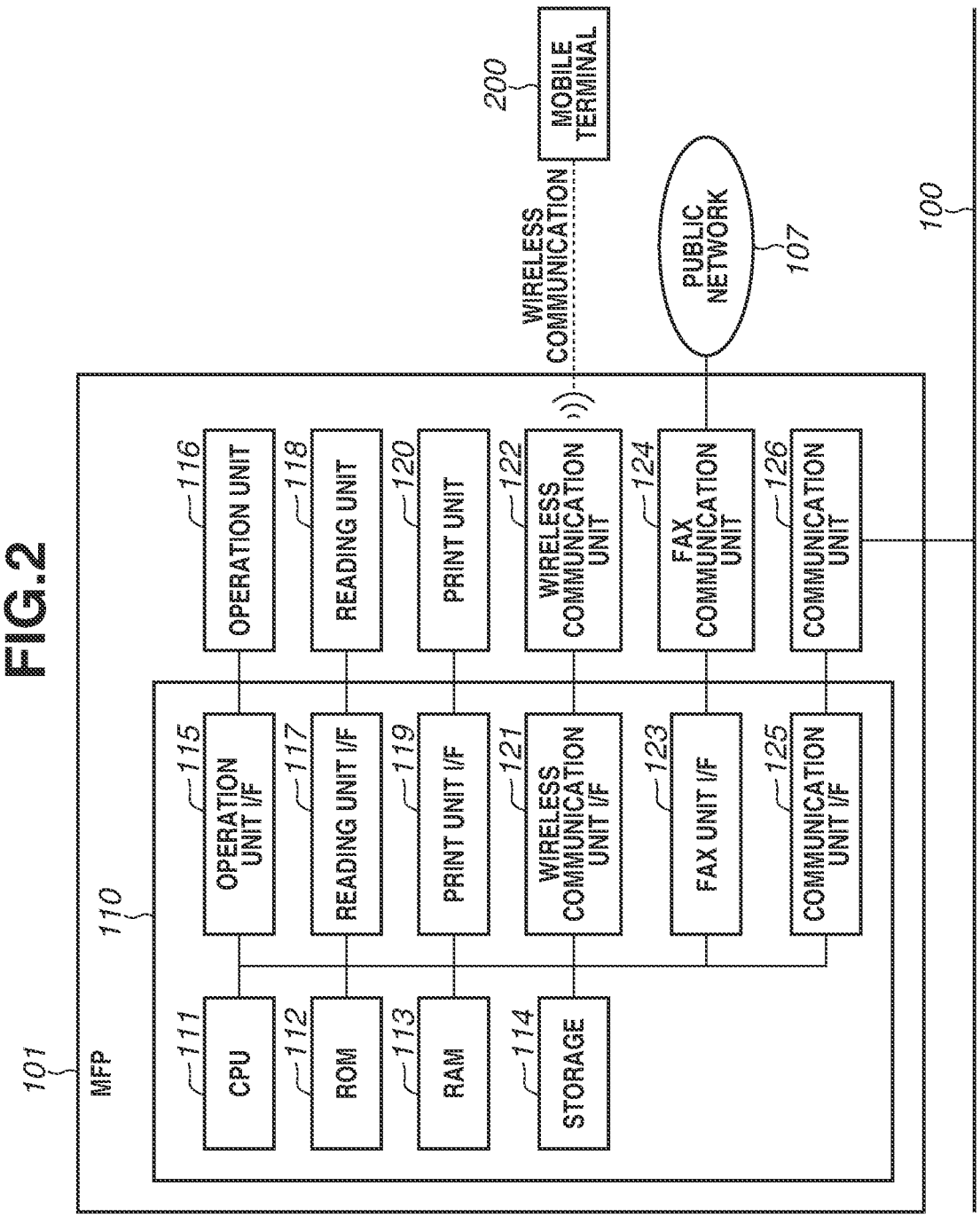
FIG. 2 is a diagram illustrating an example of a hardware configuration of a multifunction peripheral (MFP).

FIG. 2 is a diagram illustrating an example of a hardware configuration of the MFP 101. The MFP 101 includes a central processing unit (CPU) 111, a read-only memory (ROM) 112, a random-access memory (RAM) 113, a storage 114, an operation unit interface (I/F) 115, an operation unit 116, a reading unit I/F 117, a reading unit 118, a print unit 1F 119, a print unit 120, a wireless communication unit I/F 121, and a wireless communication unit 122. The MFP 101 further includes a fax unit I/F 123, a fax communication unit 124, a communication unit I/F 125, and a communication unit 126.

A control unit 110 including the CPU 111 controls operations of the whole of the MFP 101. The CPU 111 loads a control program stored in the ROM 112 or the storage 114 into the RAM 113 to perform various kinds of control such as read control and print control. The ROM 112 stores therein control programs that can be executed by the CPU 111. The ROM 112 also stores a boot program, font data, and the like. The RAM 113 is a main memory, and used as a work area and a temporary storage area to develop various kinds of control programs stored in the ROM 112 and the storage 114. The storage 114 stores image data, print data, various kinds of programs, and various kinds of setting information. The storage 114 is assumed to be a flash memory in the present exemplary embodiment, but may be an auxiliary storage device such as a solid state drive (SSD) and a hard disk drive (HDD). The storage 114 may also be an embedded Multi Media Card (eMMC).

In the MFP 101 according to the present exemplary embodiment, one CPU 111 executes each processing in a flowchart described below using one memory (RAM 113), but a configuration is not limited thereto. For example, the MFP 101 can also execute each processing in the flowchart described below by causing a plurality of CPUs, a plurality of RAMs, a plurality of ROMs, and a plurality of storages to cooperate with one another. The MFP 101 may also be configured to execute part of processing using a hardware circuit, such as an application-specific integrated circuit (ASIC) and a field-programmable gate array (FPGA).

The operation unit I/F 115 connects the control unit 110 and the operation unit 116 including a display unit such as a touch panel and hardware keys. The operation unit 116 displays information to a user, and detects an input from the user.

The reading unit I/F 117 connects the reading unit 118, such as a scanner, and the control unit 110. The reading unit 118 reads an image of an original document and the CPU 111 converts the read image to image data such as binary data. The image data generated based on the image read by the reading unit 118 is, for example, transmitted to an external apparatus or printed on recording paper.

The print unit I/F 119 connects the print unit 120, such as a printer, and the control unit 110. The CPU 111 forwards image data (print data) stored in the RAM 113 to the print unit 120 via the print unit I/F 119. The print unit 120 prints an image based on the forwarded image data on recording paper fed by a paper feeding cassette.

The wireless communication unit I/F 121 is an interface for controlling the wireless communication unit 122, and connects the control unit 110 and an external wireless apparatus (in this example, mobile terminal 200) in a wireless manner.

The control unit 110 is connected to a public network 107 by the fax unit I/F 123 controlling the fax communication unit 124 such as a facsimile. The fax unit I/F 123 is an interface for controlling the fax communication unit 124, and can be connected to the public network and perform control of a facsimile communication protocol by controlling a modem for facsimile communication or a network control unit (NCU).

The communication unit I/F 125 connects the control unit 110 and the network 100. The communication unit I/F 125 is an interface for controlling the communication unit 126 to transmit image data and various kinds of information in the MFP 101 to an external apparatus on the network 100 and receive print data from an information processing apparatus on the network 100 and information on the network 100. As a transmission/reception method via the network 100, the communication unit 126 can perform transmission/reception using e-mail and file transmission using another protocol (e.g., file transfer protocol (FTP), server message block (SMB), and web-based distributed authoring and versioning (WebDAV)). Furthermore, the communication unit 126 can transmit/receive image data and various kinds of setting data using the network 100 in response to access from the mobile terminal 200, the message application server 300, or the bot server 400 via hypertext transfer protocol (HTTP) communication.

Figure 3:
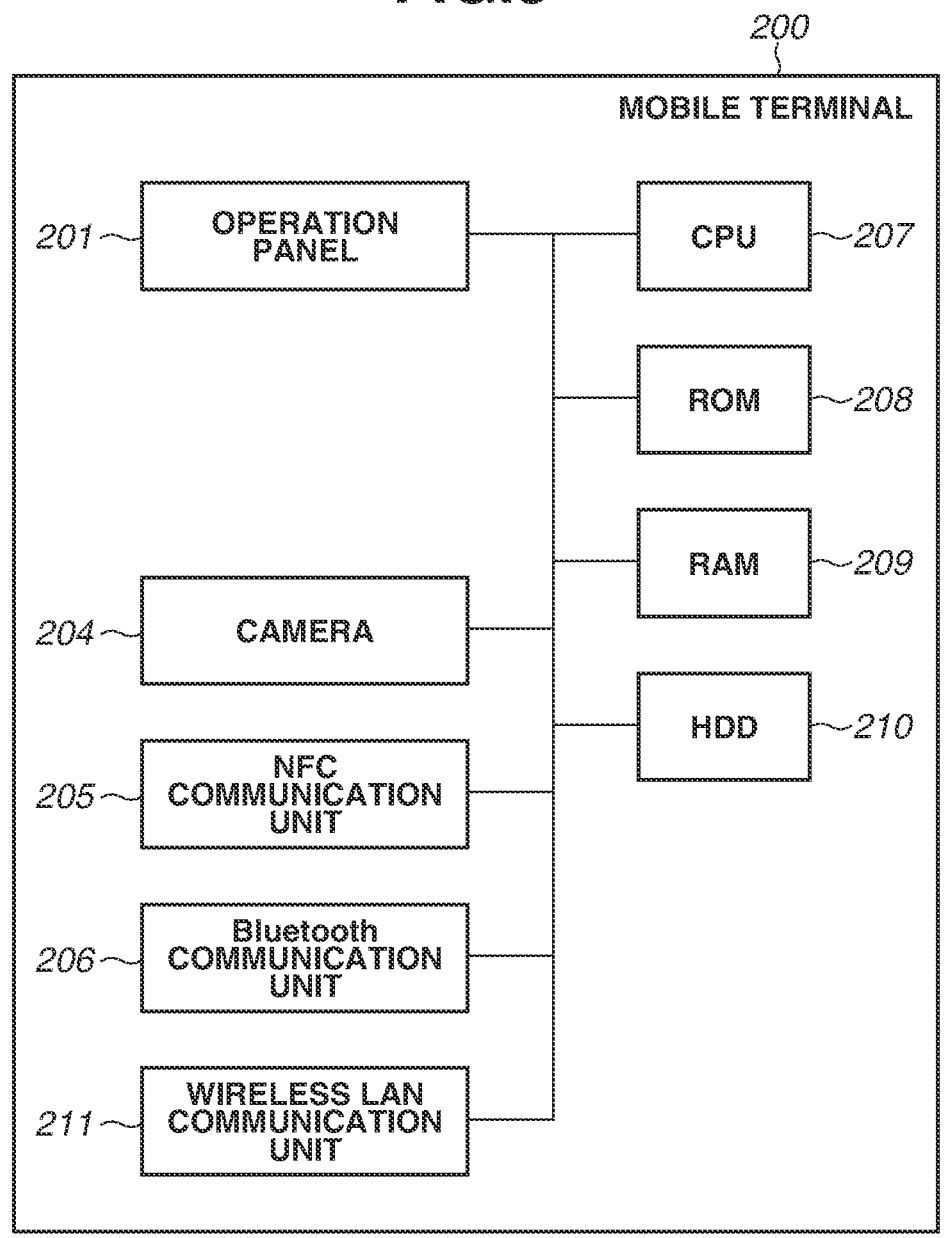
FIG. 3 is a diagram illustrating an example of a hardware configuration of a mobile terminal.

FIG. 3 is a diagram illustrating an example of a hardware configuration of the mobile terminal 200. While the mobile terminal 200 according to the present exemplary embodiment is assumed to be an apparatus such as a smartphone and a tablet PC, the mobile terminal 200 may be any type of device as long as it is an information processing apparatus capable of performing Wireless Fidelity (Wi-Fi) communication.

A CPU 207 loads a control program stored in a ROM 208 to execute various kinds of processing to control operations of the mobile terminal 200. The ROM 208 stores therein control programs. A RAM 209 is used as a main memory of the CPU 207 and a temporary storage area such as a work area. An HDD 210 stores therein various kinds of data such as a photograph and an electronic document.

An operation panel 201 has a touch panel function capable of detecting a touch operation by the user, and displays various kinds of screens provided by an operating system (OS) and an e-mail transmission application. The operation panel 201 is used to check information stored in the message application server 300. The user can input a desired operation instruction to the mobile terminal 200 by inputting a touch operation to the operation panel 201. The mobile terminal 200 includes hardware keys (not illustrated) and the user can input an operation instruction to the mobile terminal 200 using the hardware keys.

A camera 204 captures an image in response to a user instruction to capture an image. A photograph captured by the camera 204 is stored in a predetermined area in the HDD 210. The mobile terminal 200 can acquire information from a Quick Response (QR) code (registered trademark) read by the camera 204 using a program capable of analyzing the QR code.

The mobile terminal 200 can transmit and receive data to and from various kinds of peripheral devices via a near field communication (NFC) communication unit 205, a Bluetooth® communication unit 206, or a wireless LAN communication unit 211. The Bluetooth communication unit 206 of the mobile terminal 200 may support Bluetooth® Low Energy Mobile terminals have started to become in widespread use.

Figure 4:
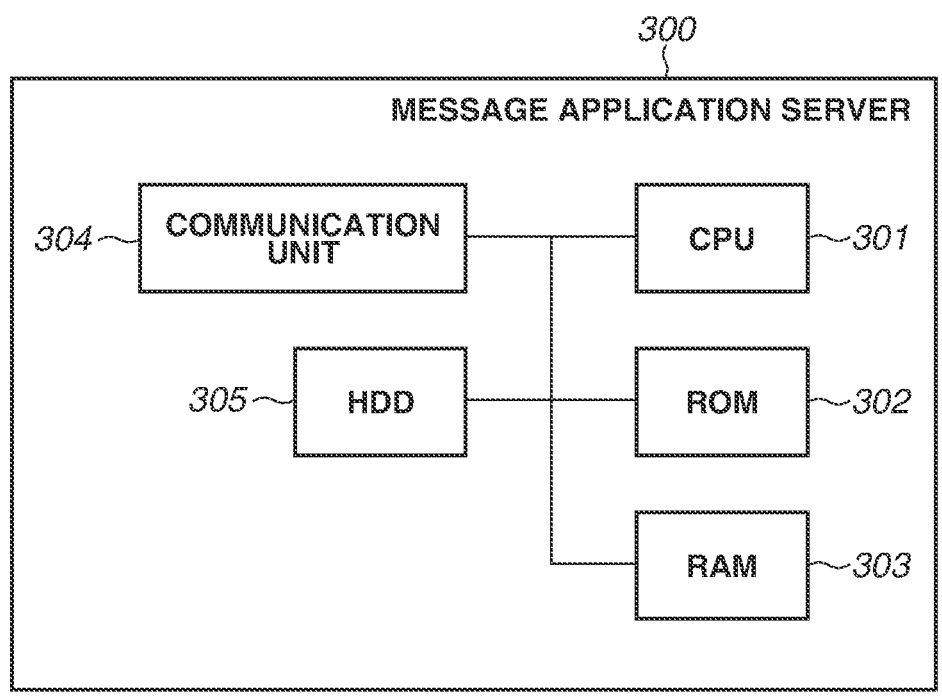
FIG. 4 is a diagram illustrating an example of a hardware configuration of a message application server.

FIG. 4 is a diagram illustrating an example of a hardware configuration of the message application server 300. A CPU 301 loads a control program stored into a ROM 302 to execute various kinds of processing to control operations of the message application server 300. The ROM 302 stores the control programs. A RAM 303 is used as a main memory of the CPU 301 and a temporary storage area such as a work area. An HDD 305 stores therein various kinds of data such as a message, an image, and channel information. The message application server 300 can give and receive data to and from various kinds of devices such as the mobile terminal 200 and the MFP 101 via a communication unit 304. The communication unit 304 may perform wired communication using Ethernet (registered trademark) or perform wireless communication such as Wi-Fi communication.

Figure 5:
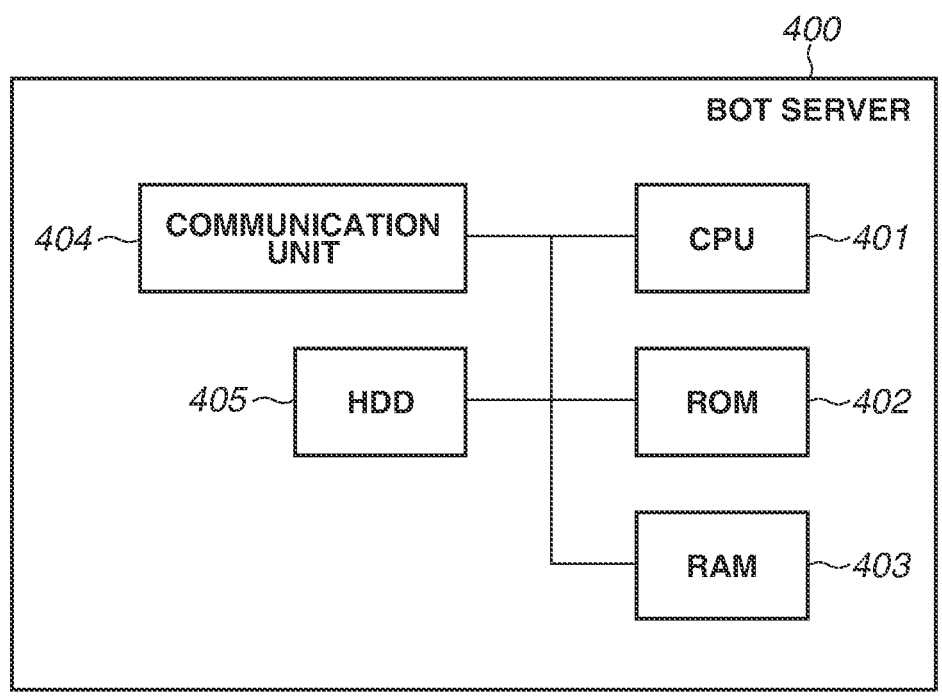
FIG. 5 is a diagram illustrating an example of a hardware configuration of a bot server.

FIG. 5 is a diagram illustrating an example of a hardware configuration of the bot server 400. A CPU 401 loads a control program stored into a ROM 402 to execute various kinds of processing to control operations of the bot server 400. The ROM 402 stores therein control programs. A RAM 403 is used as a main memory of the CPU 401 and a temporary storage area such as a work area. An HDD 405 stores therein various kinds of data such as a message, image data, and channel information. The bot server 400 can transmit and receive data to and from various kinds of devices such as the mobile terminal 200, the MFP 101, and the message application server 300 via a communication unit 404.

Figure 14:
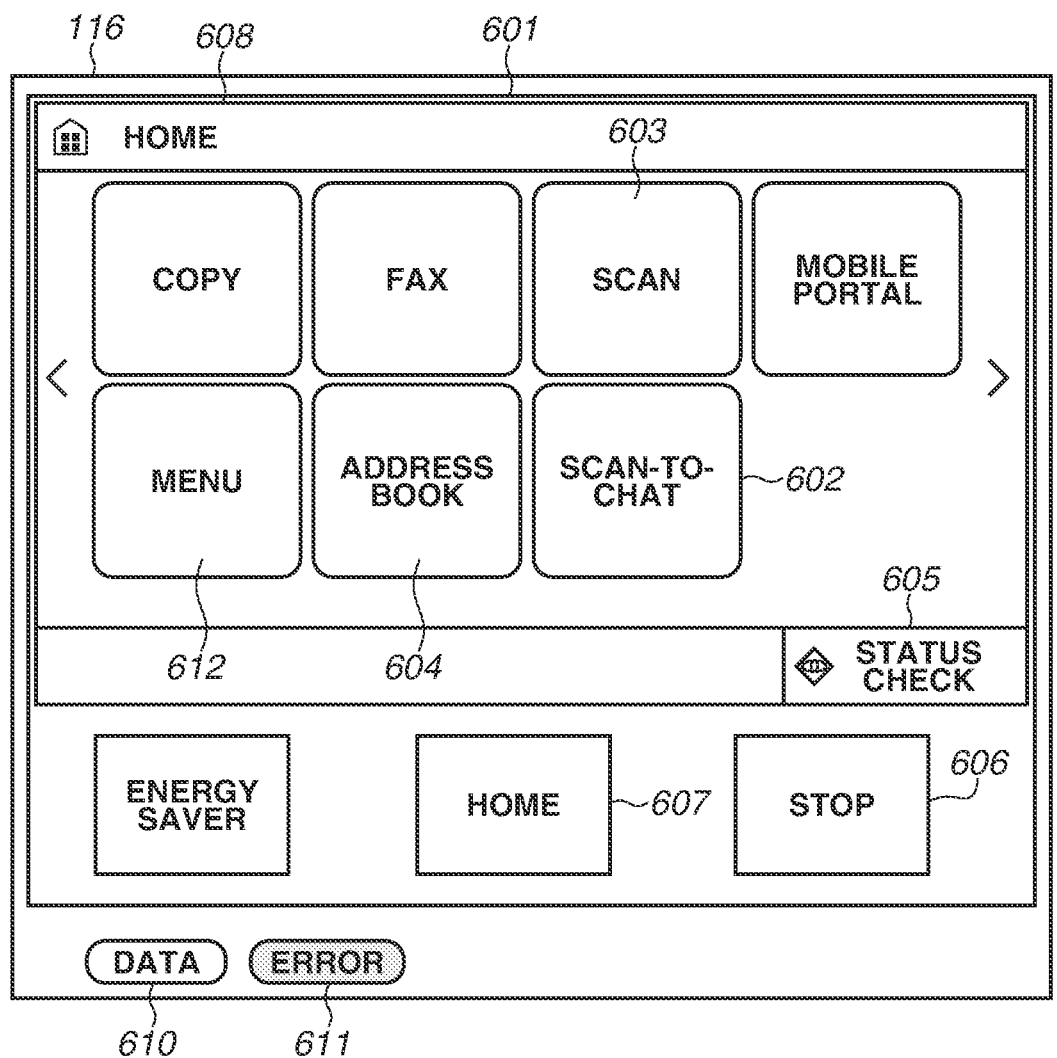
FIG. 14 is a diagram illustrating an example of a home screen displayed on an operation unit of the MFP.

FIG. 14 is a diagram illustrating an example of a home screen displayed on the operation unit 116 of the MFP 101. The operation unit 116 includes a touch panel 601 that displays an operation screen and light emitting diodes (LEDs) 610 and 611. The touch panel 601 is an instruction unit that also serves as a receiving unit to accept an instruction from the user and a display unit to display a screen. The user directly touches the screen displayed on the touch panel 601 with an object such as a user's finger and a stylus to instruct execution of each function based on the displayed screen.

The touch panel 601 illustrated in FIG. 14 displays a home screen 608. The home screen 608 is an initial screen to instruct execution of each function of the MFP 101 and to select a screen display for making various kinds of settings for functions executed by the MFP 101, such as copying, fax, scanning, and media print.

A status check button 605 is an object for displaying a screen (status check screen) for checking a status of the MFP 101. A transmission history and a job execution history can be displayed on the status check screen (not illustrated).

A scan-to-chat button 602 is an object for displaying a setting screen for scan-to-chat processing. If the scan-to-chat button 602 is selected by the user, a setting screen (scan-to-chat screen) 704 illustrated in FIG. 15B is displayed on the operation unit 116. The scan-to-chat processing will be described in detail below with reference to FIGS. 6 and 7.

A scan button 603 is an object for displaying a scan selection screen (not illustrated) from the MFP 101. The scan selection screen is a screen for selecting a transmission function such as e-mail transmission (e-mail), file transmission using the SMB, the FTP, and the HTTP, and Internet fax (iFax) communication. Touching a displayed object indicating a transmission function displays a setting screen for the transmission function.

An address book button 604 is an object for displaying an address book screen of the MFP 101 when the button is selected by the user. The LEDs 610 and 611 notify the user of the status of the MFP 101. The LED 610 lights up during transmission/reception of an email or reception or execution of a print job, and the LED 611 lights up when an error of some kind occurs in the MFP 101. A stop button 606 is an object for canceling various kinds of operations and is always displayed on the operation unit 116. A home button 607 is an object for displaying the home screen 608 and always displayed on the operation unit 116. A menu button 612 is an object for displaying a screen for making an environmental setting, such as a language, and a setting of each function.

Figure 6:
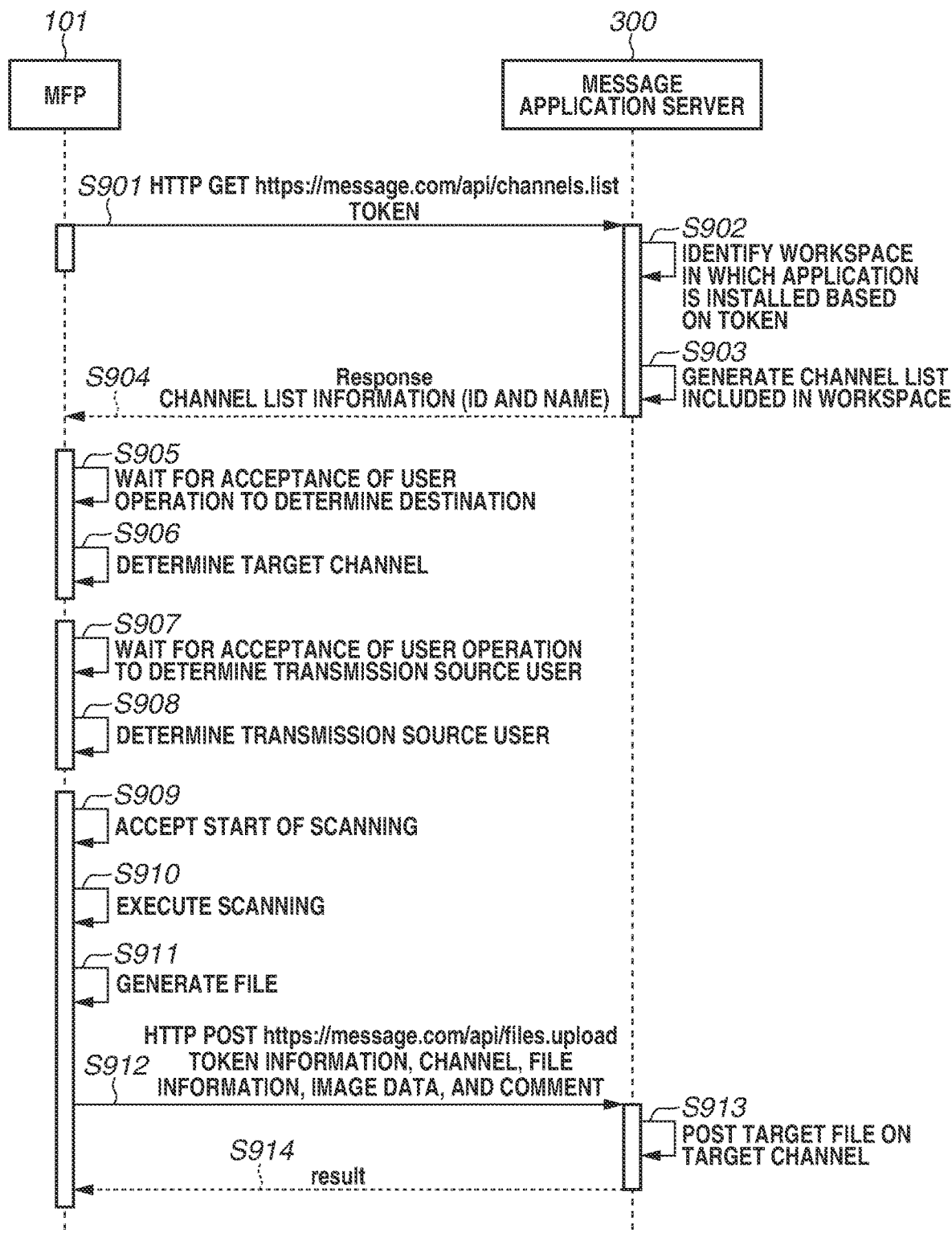
FIG. 6 is a diagram illustrating an example of a sequence of transmitting a file generated by scanning by the MFP to the message application server.

FIG. 6 is a diagram illustrating an example of a sequence of transmitting a file generated by scanning by the MFP 101 to the message application server 300. The sequence illustrated in FIG. 6 is started when a channel selection button 713 on the setting screen 704 illustrated in FIG. 15B is selected.

In step S901, the CPU 111 of the MFP 101 controls the communication unit 126 to make a request for channel list information to the message application server 300 via HTTP communication. Specifically, the communication unit 126 transmits to the message application server 300 token information input to the MFP 101 and information indicating a request for a channel list included in a workspace indicated by the token information. A command to be transmitted here is, for example, "HTTP GET https://message.com/api/channels.list". A uniform resource locator (URL) "https.//message.com/api/channels.list" described in this command is a URL for accessing the message application server 300. Transmitting the token information to this URL causes the message application server 300 to search for a workspace and bot application corresponding to the token information. The token information is input by the user via a setting registration screen 1501 that is displayed on the operation unit 116 of the MFP 101 and illustrated in FIG. 13.

The workspace is like an organization to which a plurality of users belongs in a message application. The channel is like a chat room in the workspace. The chat room mentioned herein is a mechanism for a plurality of users participating in the chat room to transmit and receive a message among them and communicate with each other like having a conversation. While a description will be given of an example in which the channel is a chat room in the present exemplary embodiment, the channel only needs to be a mechanism for a plurality of users to transmit and receive a message among them and communicate with each other like having a conversation, and is not limited to the chat room. For example, the channel may be like a group chat, a room, a talk room, or a group.

The bot application is an application for registering the MFP 101 as a user in the message application and post a message and/or image data, and is installed in the message application server 300. Designating the bot application and transmitting image data to the message application server 300 causes the bot application to post the transmitted image data on the message application. The HDD 305 of the message application server 300 stores therein the bot application and a token in association with each other, and the bot application and the workspace in association with each other. Thus, by receiving token information from the MFP 101, the message application server 300 can return information about the workspace associated with the bot application associated with the token information. Alternatively, the token information, the bot application, and the workspace may be directly associated with one another. With this configuration, it is possible to select a workspace corresponding to token information registered in advance (a workspace to which a user wants to transmit image data) from a number of workspaces.

In step S902, the CPU 301 of the message application server 300 refers to the token information received via the communication unit 304 and searches the HDD 305 for workspace information and the bot application included in the token information.

In step S903, the CPU 301 of the message application server 300 checks if an access to the URL is permitted based on the token information received via the communication unit 304 from the MFP 101. If the access is permitted, the CPU 301 generates channel list information included in the workspace corresponding to the token information. The channel list information is array information indicating channel information. The channel information includes a channel identification (ID), a channel name, information indicating users participating in the channel, and a channel setting value indicating a setting as to whether the channel is an archive channel.

In step S904, the CPU 301 of the message application server 30) controls the communication unit 304 to transmit the channel list information as response information of the HTTP communication to the MFP 101.

Figure 15A:
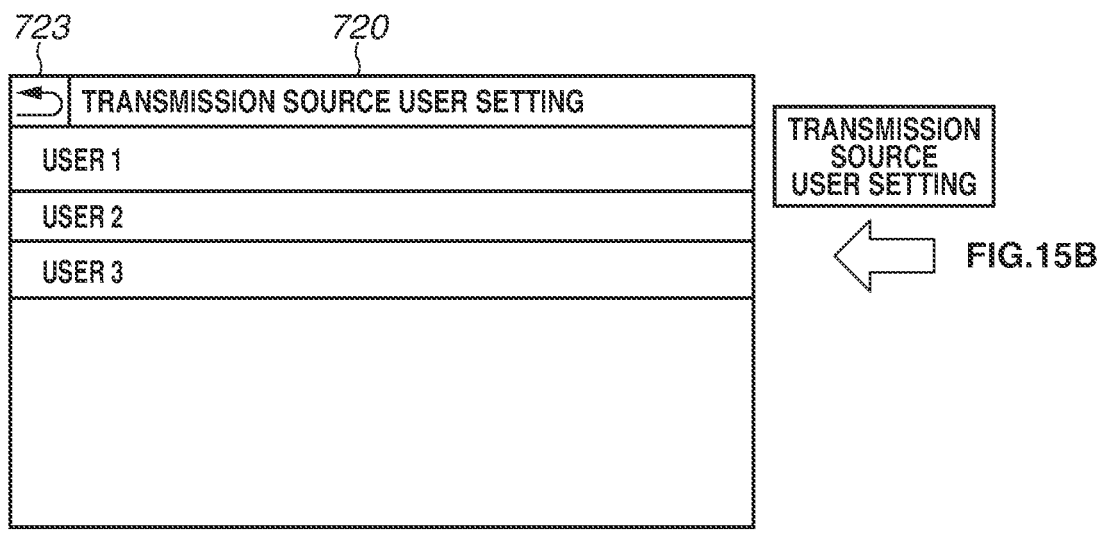
FIGS. 15A, 15B and 15C are diagrams illustrating an example of screen transition in the scan-to-chat processing.
Figure 15B:
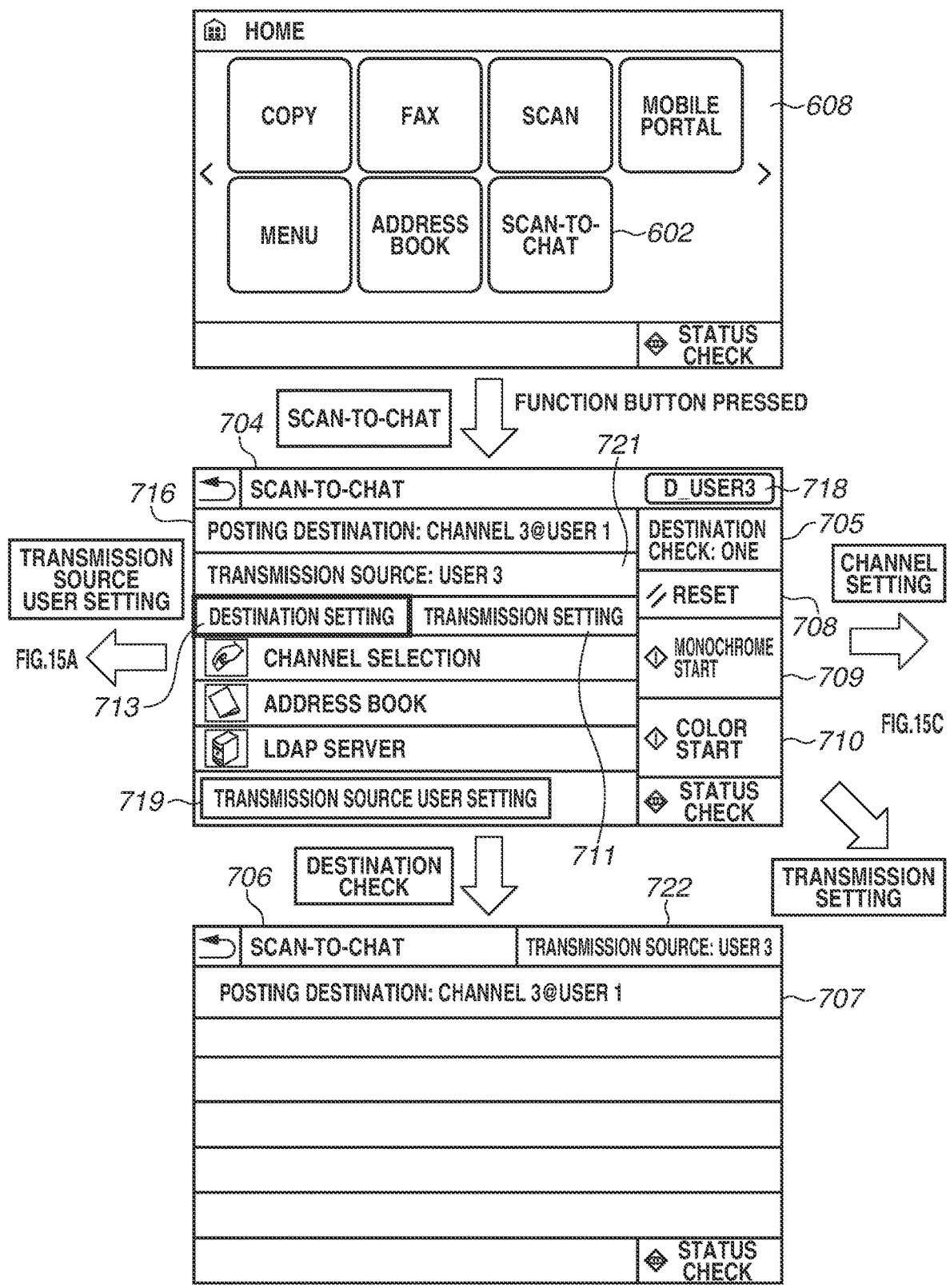
Figure 15C:

In step S905, the CPU 111 of the MFP 101 generates a channel selection screen 714 illustrated in FIG. 15C based on the channel information included in the received channel list information. The CPU 111 of the MFP 101 then displays the channel selection screen 714 on the touch panel 601 of the operation unit 116 when the channel selection button 713 is selected by the user, and waits for a user operation. The channel selection screen 714 will be described below with reference to FIGS. 15A to 15C.

In step S906, the CPU 111 of the MFP 101 determines channel information of a posting destination if at least a channel is selected on the channel selection screen 714 and a back button 715 illustrated in FIG. 15C is selected.

In step S907, the CPU 111 of the MFP 101 generates a transmission source user setting screen 720 illustrated in FIG. 15A based on user information of the users participating in the channel included in the channel list information received in step S904. The CPU 111 of the MFP 101 then displays the transmission source user setting screen 720 on the touch panel 601 of the operation unit 116 if a transmission source user setting button 719 illustrated in is selected by the user, and waits for a user operation. The transmission source user setting screen 720 will be described below with reference to FIGS. 15A to 15C.

In step S908, when a user is selected in the transmission source user setting screen 720, the CPU 111 of the MFP 101 stores the user selected as a transmission source user in the RAM 113 or the storage 114.

In step S909, the CPU 111 of the MFP 101 accepts a scan execution instruction via the operation unit 116.

In step S910, the CPU 111 of the MFP 101 performs scanning based on a scan setting which has been set before the acceptance of the scan execution instruction.

In step S911, the CPU 111 of the MFP 101 generates, based on the scanned image, image data in a format set by the scan setting. Here, a scan setting designated by the user on a detailed scan-to-chat setting screen (not illustrated) is used as the scan setting. The scan setting may be displayed together with a transmission setting on a transmission setting screen 712 illustrated in FIG. 15C and set.

In step S912, the CPU 111 of the MFP 101 transmits the same token information as that transmitted in step S901 and the channel information of the posting destination selected in step S906 to the message application server 300 via the communication unit 126 using HTTP communication. In addition, the CPU 111 transmits file information, the image data generated in step S911, and a comment to the message application server 300 via the HTTP communication. The file information includes a file format, a file name, and title information. A file format designated by the user on the transmission setting screen 712 for scan-to-chat is used as the file format. The comment includes the user name of the transmission source user stored in step S908. The title information includes device information (an installation location and a model name) of the MFP 101 used for the transmission and the user information about the user who has logged in to the MFP 101. The installation location and the model name included in the device information is information preliminarily set by the user via the operation unit 116 of the MFP 101 or an external apparatus such as a PC.

In step S913, the CPU 301 of the message application server 300 searches for workspace information and application information registered with the token information received in step S910, and stores the received image data and the channel designated by the channel information in association with each other. In a case where a posting destination user is designated, the CPU 301 stores the received image data, the channel, and the posting destination user in further association with one another. With this configuration, when the user activates the message application on the mobile terminal 200 and designates a channel to check the content of a previous conversation on the channel, a screen on which the received image data has been posted is displayed.

In step S914, the CPU 301 of the message application server 300 transmits, to the MFP 101, a result indicating whether posting has been successful as response information of the HTTP communication. In a case where the posting has been successful, the CPU 111 of the MFP 101 may display a notification that the posting has been successful on the operation unit 116. In a case where the posting has failed, on the other hand, the CPU 111 of the MFP 101 may display a notification that the posting has failed on the operation unit 116. Alternatively, the CPU 111 of the MFP 101 may display the notification that the posting has failed only when the posting has failed without displaying any notification when the posting has been successful.

Figure 7:
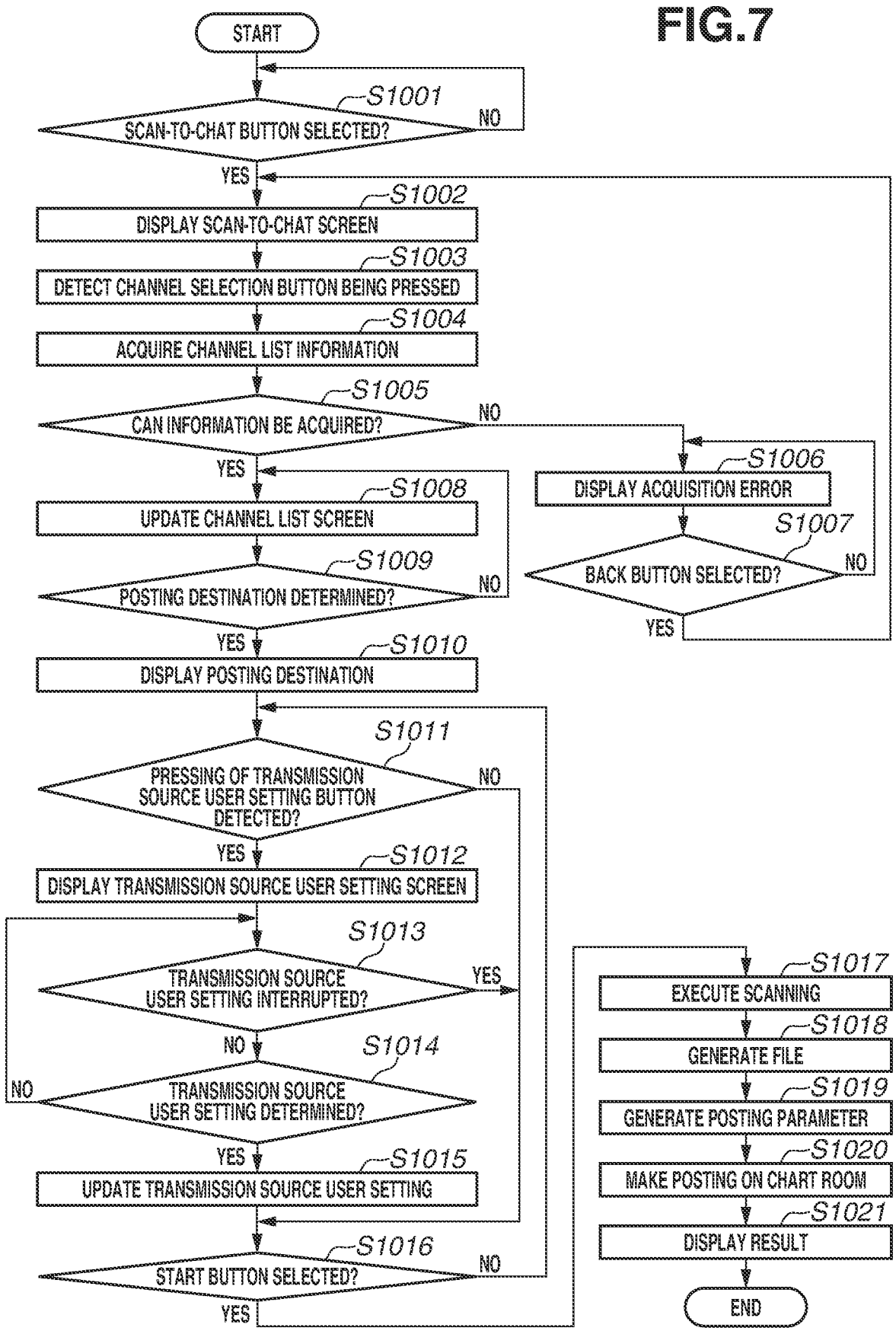
FIG. 7 is a flowchart illustrating an example of scan-to-chat processing executed by the MFP.

FIG. 7 is a flowchart illustrating an example of the scan-to-chat processing executed by the MFP 101. The processing in the flowchart illustrated in FIG. 7 is executed by the CPU 111 loading a program stored in the ROM 112 into the RAM 113 and executing the program. The flow of processing in illustrated in FIG. 7 is started when the MFP 101 is powered on.

In step S1001, the CPU 111 determines whether the scan-to-chat button 602 has been selected. In a case where the CPU 111 determines that the scan-to-chat button 602 has been selected (YES in step S1001), the processing proceeds to step S1002. In a case where the CPU 111 determines that the scan-to-chat button 602 has not been selected (NO in step S1001), the processing returns to step S1001.

In step S1002, the CPU 111 displays the scan-to-chat screen 704 on the touch panel 601 of the operation unit 116. Screen transition in a case where the scan-to-chat button 602 has been selected will be described with reference to FIGS. 15A to 15C.

FIGS. 15A to 15C are diagrams illustrating an example of screen transition in the scan-to-chat processing. Selecting the scan-to-chat button 602 displayed on the home screen 608 causes the touch panel 601 of the operation unit 116 to display the scan-to-chat screen 704.

A destination check button 705 is displayed on the scan-to-chat screen 704. The number of destinations set as posting destinations of the image data generated by scanning is displayed on the destination check button 705. A description will be given of the example illustrated in FIGS. 15A to 15C in which one channel serving as the posting destination has been selected. In a case where a plurality of destinations has been selected, the number of set posting destinations is displayed as the number of destinations.

If the destination check button 705 is selected, a scan-to-chat destination check screen 706 is displayed. A posting destination set on the channel selection screen 714 is displayed on the scan-to-chat destination check screen 706. Selection of a posting destination button 707 on the scan-to-chat destination check screen 706 displays a detailed screen (not illustrated), on which details of the set posting destination are displayed. In addition, it is possible to check a user name set as the transmission source in a region 722 on the scan-to-chat destination check screen 706.

While only one posting destination is displayed on the scan-to-chat destination check screen 706 in the present exemplary embodiment, the number of posting destinations is not limited thereto. For example, if a plurality of posting destinations are set on the channel selection screen 714, a plurality of posting destination buttons are displayed on the scan-to-chat destination check screen 706.

In a case where a reset button 708 is selected on the scan-to-chat screen 704, the set information is cleared. At this time, the set posting destination and the transmission source user are cleared. In a case where a monochrome start button 709 or a color start button 710 is selected on the scan-to-chat screen 704, scanning and transmission processing starts.

If a transmission setting button 711 is selected, the transmission setting screen 712 is displayed. On this screen, a transmission setting such as a file format 717 can be changed and checked.

If the channel selection button 713 is selected, the channel selection screen 714 is displayed. The channels and users displayed on the channel selection screen 714 are displayed based on the channel list information received by the MFP 101 from the message application server 300. On this screen, it is possible to select a posting destination channel and a user, from among the users belonging to the channel, to which notification is to be made. That is, it is possible to select a channel on which the posting is made and a user to be mentioned. When a channel button is selected, users belonging to the channel are displayed on a pull-down menu. On this screen, both the channel and the user may be selected, or only the channel may be selected to make the posting to all the users belonging to the channel. Alternatively, a plurality of channels may be selected, or one channel may be selected and a plurality of users belonging to the channel may be selected. Alternatively, a plurality of channels may be selected and different users belonging to the respective channels are selected.

If the back button 715 is selected, the content of the selected channel is retained, and the scan-to-chat screen 704 is displayed again. At this time, "POSTING DESTINATION: CHANNEL 3@USER 1" indicating the name of the selected channel and the name of the user to be notified, i.e., the posting destination, are displayed in a posting destination field 716. In addition, the CPU 111 of the MFP 101 stores the posting destination based on the channel and the user set at this time in the RAM 113 or the storage 114.

If the transmission source user setting button 719 is selected, the transmission source user setting screen 720 is displayed on the touch panel 601. On this screen, it is possible to select to which user the posting is made as the transmission source user. Users displayed on this transmission source user setting screen 720 are the users included in the channel selected on the channel selection screen 714. Since a channel 3 is selected on the channel selection screen 714 in FIG. 15C, users 1 to 3 included in the channel 3 are displayed on the transmission source user setting screen 720. This increases a possibility that there are a fewer number of selectable users displayed on the transmission source user setting screen 720, thereby saving user's time and effort in finding a transmission source user.

As user names to be displayed on the transmission source user setting screen 720, the names of users included in all pieces of channel information received by the MFP 101 from the message application server 300 may be displayed. Alternatively, users included in an arbitrary channel may be displayed irrespective of the channel selected on the channel selection screen 714.

Furthermore, in a case where a plurality of channels is selected on the channel selection screen 714, users included in all of the selected channels may be displayed. For example, in a case where users 1, 2 and 3 are included in the channel 3, the users 2 and 3 are also included in a channel 4, and the channels 3 and 4 are selected on the channel selection screen 714, the users 2 and 3 are displayed on the transmission source user setting screen 720.

In the description of the present exemplary embodiment, the transmission source user setting button 719 is selectable in a case where the posting destination channel has been selected. If a user is selected on the transmission source user setting screen 720 or a back button 723 is selected, the scan-to-chat screen 704 is displayed again. At this time, the "USER 3", which is the name of the transmission source user, is displayed in a transmission source field 721 (in a case where the user 3 is selected on the transmission source user setting screen 720).

A "user name" of a user or a "guest" who has currently logged in to the MFP 101 is displayed in a user name 718. The user name 718 is not displayed in the MFP 101 to which a log-in setting has not been set.

The description will be back to the processing in the flowchart illustrated in FIG. 7. In step S1002, the CPU 111 displays the scan-to-chat screen 704 illustrated in FIG. 15B on the operation unit 116. In step S1003, the CPU 111 detects that the channel selection button 713 is selected.

In step S1004, the CPU 111 executes, in response to selection of the channel selection button, processing of transmitting information indicating the request for the channel list information to the message application server 300 via the HTTP communication using token information 1503 (FIG. 13) registered in advance.

Figure 13:
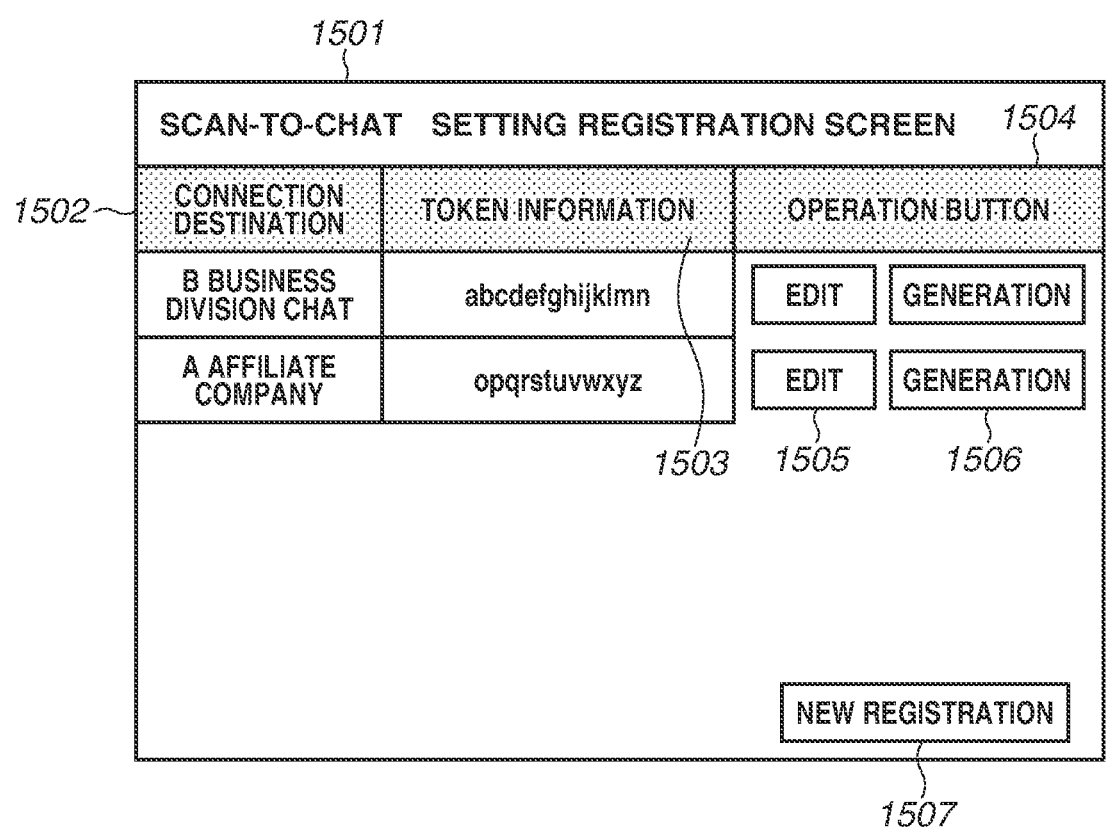
FIG. 13 is a diagram illustrating an example of a setting registration screen.

Here, the setting registration screen 1501 illustrated in FIG. 13 will be described. FIG. 13 is a diagram illustrating an example of the setting registration screen 1501. The setting registration screen 1501 is a screen displayed on the operation unit 116 of the MFP 101. The setting registration screen 1501 may be displayed as a web page on an operation unit of an information processing apparatus such as a PC connected to the MFP 101 via the network. The content registered via the setting registration screen 1501 is stored in the storage 114 according to the first exemplary embodiment, and stored in the HDD 405 according to a second exemplary embodiment.

A connection destination 1502 is a column of pieces of organization information of connection destinations. The token information 1503 is a column of pieces of registered token information. An operation button 1504 is a column of operation buttons. An edit button 1505 and a generation button 1506 are displayed in the column of the operation button 1504.

If the edit button 1505 is selected, a character string such as token information and connection destination information can be input and changed by a keyboard and the like. If the generation button 1506 is selected, the scan-to-chat button 602 is set to be displayed on the home screen 608. The content registered on the setting registration screen 1501 is stored in the storage 114 according to the first exemplary embodiment.

The CPU 111 can accept an input of the character string by the user, and add and register the connection destination and the token information if a new registration button 157 is selected.

The description will be back to the processing in the flowchart illustrated in FIG. 7. In step S1005, the CPU 111 determines whether the channel list information has been received from the message application server 300 in response to the request for acquiring the channel list information transmitted in step S1004. Specifically, the CPU 111 determines that the channel list information has not been received in a case where a status code in a response of the HTTP communication is an error, or in a case where a parameter indicating that the information cannot be acquired is included in body information of the response. In a case where the CPU 111 determines that the channel list information has been received (YES in step S1005), the processing proceeds to step S1008. In a case where the CPU 111 determines that the channel list information has not been received (NO in step S1005), the processing proceeds to step S1006.

In step S1006, the CPU 111 displays information indicating that the channel list information has not been received on the channel selection screen 714. At this time, options of channels and users are not displayed on the channel selection screen 714.

In step S1007, the CPU 111 determines whether the back button 715 has been selected. In a case where the CPU 111 determines that the back button 715 has been selected (YES in step S1007), the processing returns to step S1002. In a case where the CPU 111 determines that the back button 715 has not been selected (NO in step S1007), the processing returns to step S1006.

In step S1008, the CPU 111 displays, on the touch panel 601 of the operation unit 116, the channel selection screen 714 on which the channel list information received from the message application server 300 is displayed.

In step S1009, the CPU 111 detects whether the posting destination (a channel, or a channel and user) selected on the channel selection screen via the touch panel 601 of the operation unit 116 has been determined. In a case where the posting destination has been determined (YES in step S1009), the processing proceeds to step S1010. In step S1010, the CPU 111 updates posting channel list information. In a case where the posting destination has not been determined (NO in step S1009), the processing returns to step S1008. A method of detecting the determination is to detect whether the back button 715 has been selected. In a case of a screen configuration in which a determination button is displayed on the screen of the operation unit 116, the CPU 111 performs similar transition when the determination button is selected.

In step S1010, the CPU 111 displays the scan-to-chat screen 704 illustrated in FIG. 15B on the operation unit 116, and updates the display of the posting destination field 716 with the posting destination determined in step S1009. At this time, the CPU 111 also displays information about the user to be notified, together with the posting destination channel on the operation unit 116.

In step S1011, the CPU 111 determines whether the transmission source user setting button 719 has been selected. In a case where the CPU 111 determines that the transmission source user setting button 719 has been selected (YES in step S1011), the processing proceeds to step S1012. In a case where the CPU 111 determines that the transmission source user setting button 719 has not been selected (NO in step S1011), the processing returns to step S1016.

In step S1012, the CPU 111 displays the transmission source user setting screen 720 on the touch panel 601. In step S1013, the CPU 111 determines whether the back button 723 has been selected. That is, the CPU 111 determines whether the selection of the transmission source user has been interrupted. In a case where the CPU 111 determines that the back button 723 has been selected (YES in step S1013), the processing proceeds to step S1016. In a case where the CPU 111 determines that that the back button 723 has not been selected (NO in step S1013), the processing returns to step S1014.

In step S1014, the CPU 111 determines whether a user displayed on the transmission source user setting screen 720 has been selected. In a case where the CPU 111 determines that the user displayed on the transmission source user setting screen 720 has been selected (YES in step S1014), the processing proceeds to step S1015. In a case where the CPU 111 determines that the user displayed on the transmission source user setting screen 720 has not been selected (NO in step S1014), the processing returns to step S1013.

In step S1015, the CPU 111 stores the user selected as the transmission source user in the RAM 113 or the storage 114, and displays the scan-to-chat screen 704 on which the setting of the transmission source user has been reflected on the touch panel 601. In a case where no user is selected, the screen remains unchanged.

In step S1016, the CPU 111 determines whether the monochrome start button 709 or the color start button 710 displayed on the operation unit 116 has been selected. In a case where the CPU 111 determines that the monochrome start button 709 or the color start button 710 has been selected (YES in step S1016), the processing proceeds to step S1017. In a case where the CPU 111 determines that the monochrome start button 709 or the color start button 710 has not been selected (NO in step S1016), the processing returns to step S1011.

In step S1017, the CPU 111 controls the reading unit 118 based on a scan setting to read an image of an original document and generate image data. A scan setting designated by the user on the detailed setting screen for scan-to-chat (not illustrated) is used as the scan setting.

In step S1018, the CPU 111 converts the image data generated in step S1017 into the file format 717 set on the transmission setting screen.

In step S1019, the CPU 111 generates a posting parameter. The posting parameter includes the posting destination channel, the file information, and a posting comment.

The posting comment includes a character string including the name of the transmission source user selected on the transmission source user setting screen and the name of the posting destination user selected on the channel selection screen 714. For example, the user 3 has been set as the transmission source user and the user 1 has been set as the posting destination user, the posting comment includes a character string of "from USER 3@USER 1". Transmitting such transmission source information to the message application server 300 enables checking of the transmission source of the image data on the message application. In addition, transmitting the information about the user selected from the pieces of information about users included in the channel selected by the user as the posting destination eliminates the need for registering individual authentication information of the user to be used on the message application in the MFP 101, thereby preventing deterioration of security.

The file information includes a file format, a file name, and title information. The title information includes, for example, character string information displayed as a title in a format of "Send from XXXX with YYYY MFP". Here, "XXXX" indicates the user name of the logged-in user of the MFP 101, and "YYYY" indicates the installation location of the MFP 101. In this example, if the user name of the logged-in user of the MFP 101 is "D_USER 3" and the installation location is a "3rd floor", a character string of "Send from D_USER 3 with 3rd floor MFP" is set as the title information.

A file format corresponding to the file format 717 set by the transmission setting is set as the file format. A file name designated by the transmission setting is designated as the file name. In the present exemplary embodiment, the description has been given of the example in which the title information includes the information about the log-in user of the MFP 101 and the installation location information of the MFP 101, and the posting comment includes the information about the user (transmission source user information) belonging to the chat that has been selected by the user. However, this configuration does not limit the exemplary embodiments of the present disclosure. For example, the information may be included in other region than the posting parameter, such as a posting user name.

In step S1020, the CPU 111 transmits the file generated in step S1018 and the posting parameter to the message application server 300 in a POST method for HTTP communication using the token information 1503 registered in advance. These pieces of data (the file generated by converting the image data and the posting parameter) are transmitted to the message application server 300, and the message application server 300 to perform control such that the received file is posted to the received user in the received channel.

In step S1021, the CPU 111 receives a posting result from the message application server 300 and displays the posting result on the touch panel 601 of the operation unit 116. According to the present exemplary embodiment, the user can easily post the file on the channel of the message application server 300 from the MFP 101.

Only one piece of token information is registered in the present exemplary embodiment. In a case where a plurality of pieces of token information is registered, the processing related to the token information, such as the processing in steps S1004, S1005, and S1020, is executed the number of times equal to the number of registered tokens.

Figure 12:
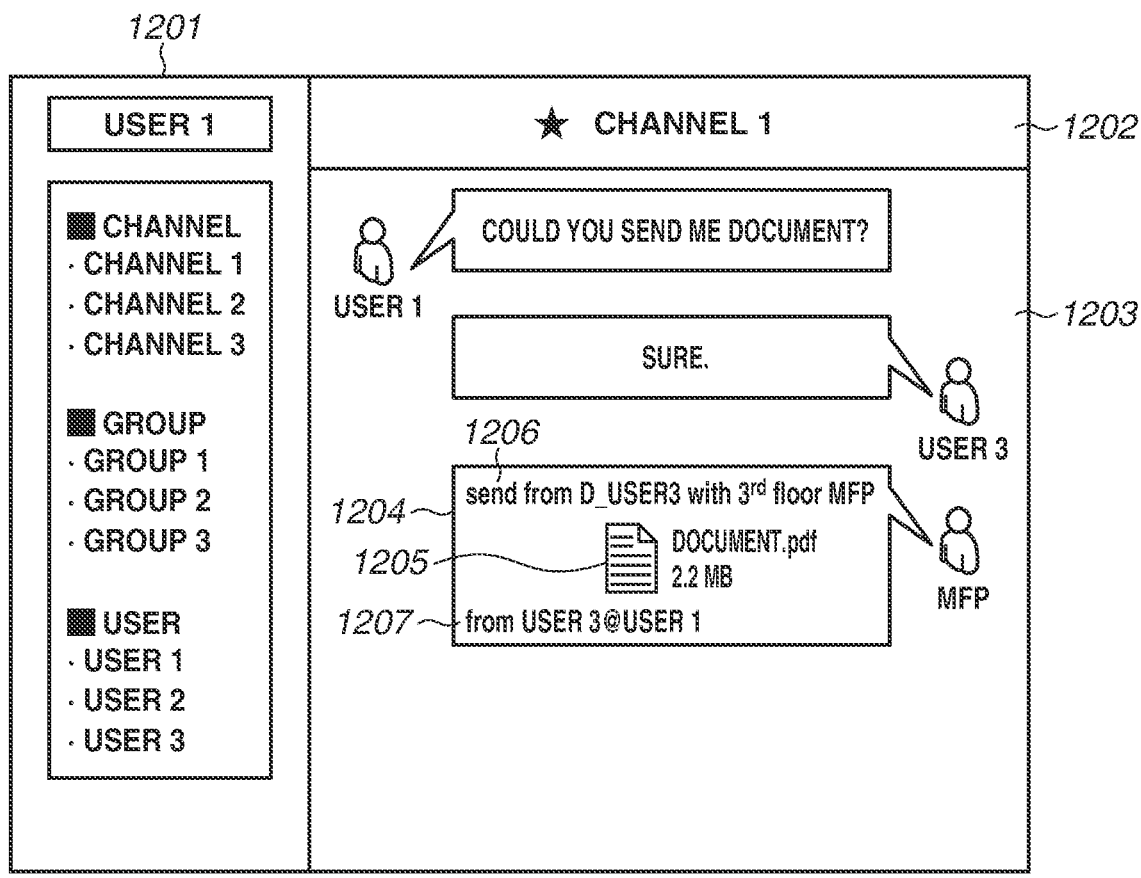
FIG. 12 is a diagram illustrating an example of a message screen of a message application.

With reference to FIG. 12, a description will be given of an example of a screen to be displayed on the operation panel 201 of the mobile terminal 200 when the file generated by converting the image data and the posting parameter are transmitted to the message application server 300 in step S1020.

FIG. 12 is a diagram illustrating an example of a message screen of the message application. A message screen 1201 illustrated in FIG. 12 is displayed when the message application is activated on the mobile terminal 200, and the processing in step S1020 is executed in the MFP 101. At this time, the mobile terminal 200 is communicating with the message application server 300.

When a user activates the message application on the mobile terminal 200 and logs in to the message application by inputting the user's account ID and password, a screen dedicated to the user is displayed.

A message 1204 is a message to be displayed (posted) when a user having an account of the user 3 transmits the image data generated by scanning and the posting parameter to the message application server 300 using the MFP 101. In the example illustrated in FIG. 12, "CHANNEL 1" is selected as the posting channel in the posting parameter. A character string of "Send from D_USER 3 with 3rd floor MFP" is displayed based on the title information included in the file information received from the MFP 101. As the file name, "DOCUMENT.pdf" is displayed. In addition, a character string of "from USER 3 @USER 1" is displayed based on the posting comment received from the MFP 101.

In addition, channels in which the log-in user participates, groups, and users are displayed on the message screen 1201 of the message application. Furthermore, exchange of messages 1203 is displayed. In a case where the posting is made using the file information added thereto, title information 1206 of the file, the file name, a thumbnail, an icon 1205, and a posting comment 1207 are displayed as a display of a posting content, i.e., the message 1204. At the time of posting, posting a comment in which "@2" is added to the head of the user name as the posting comment 1207 indicates that the posting user wants to notify especially the designated user among the users belonging to the channel. Designating "@USER 1" as the posting destination user allows the user 1 to notice that the posting has been received more quickly than the other members belonging to the channel in accordance with the function of a terminal by which the user is browsing the message application. In a case where the mobile terminal 200 by which the user 1 is browsing the message application is a smartphone, the mobile terminal 200 notifies the user 1 by a function of icon notification, vibration, or ring alert. In a case where the mobile terminal 200 by which the user 1 is browsing the message application is a desktop terminal, the mobile terminal 200 notifies the user 1 by a desktop notification function or the like.

Figure 11:
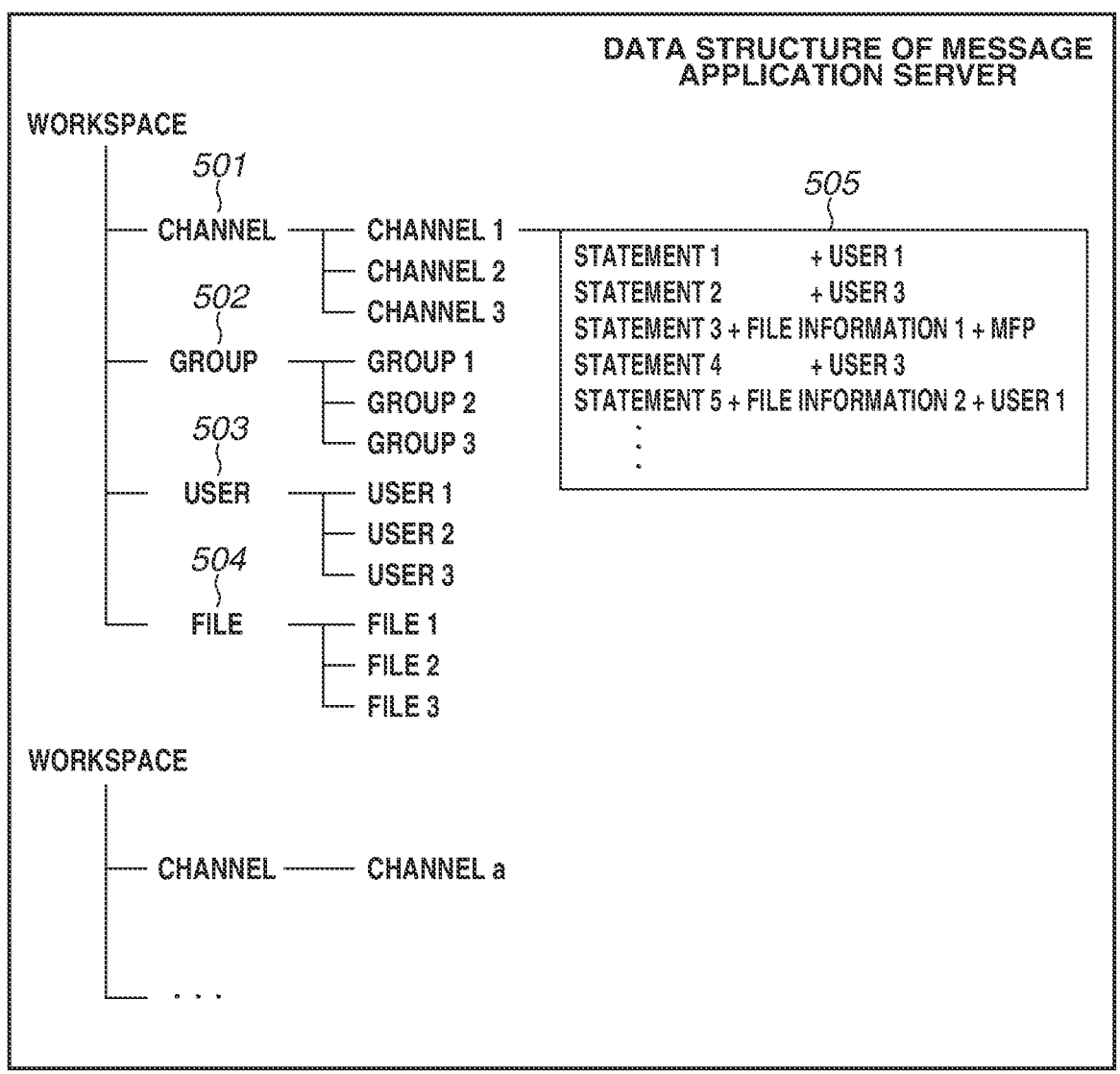
FIG. 11 is a diagram illustrating an example of a file structure in the message application server.

In displaying this screen, the message application server 300 searches a data structure illustrated in FIG. 11 for necessary information and displays the information. For example, the posting of the message 1204 corresponds to "statement 3+file information 1+MFP" in an exchanged content 505 in FIG. 11, and the message application server 30) acquires attribute information such as the name of a file 1 from a file 504, and displays the attribute information in a form of a file icon in the message. When this file icon is selected by the user, the file 1 belonging to the file 504 can be acquired. While the file posted on this channel is displayed by an icon, a preview image of the file may be displayed instead. The user 1 and the user 3 displayed here are the names of users.

FIG. 11 is a diagram illustrating an example of a file structure in the message application server. This file structure is stored in the HDD 305 of the message application server 300, and the screen illustrated in FIG. 12 is displayed based on this file structure. The message application server 300 has small groups of channels, groups, users and files in a larger group called a workspace to manage data.

A channel 501 is a type of a chat room in which all members of the workspace can participate and any of the members can search for all posted content. A group 502 is a channel for discussion that should not be open to all the members, and a member needs an invitation for browsing and participation. A user 503 is a group of users who participate in the workspace. An attached file is stored in the file 504. Furthermore, the exchanged content 505 in the channel 501, the group 502 and the user 503 is stored in association with each other.

For example, users who participate in the channel 1 are stored in association with the channel 1, and messages and image data exchanged in the channel 1 are also stored in association with the channel 1. As data is stored in this manner, a user corresponding to designated channel information can be displayed when a channel is selected on the channel selection screen 714. Users who participate in the channel can be displayed.

Executing the processing described above enables identification the user who has transmitted the image data generated by scanning by the MFP 101. Furthermore, executing the processing reduces a possibility of leakage of authentication information.

Second Exemplary Embodiment

In the first exemplary embodiment, the description has been given using the example in which the MFP 101 transmits the image data and the posting parameter directly to the message application server 300. In the present exemplary embodiment, a description will be given of an example in which the MFP 101 transmits the image data and the posting parameter to the message application server 300 via the bot server 400.

Figure 8:
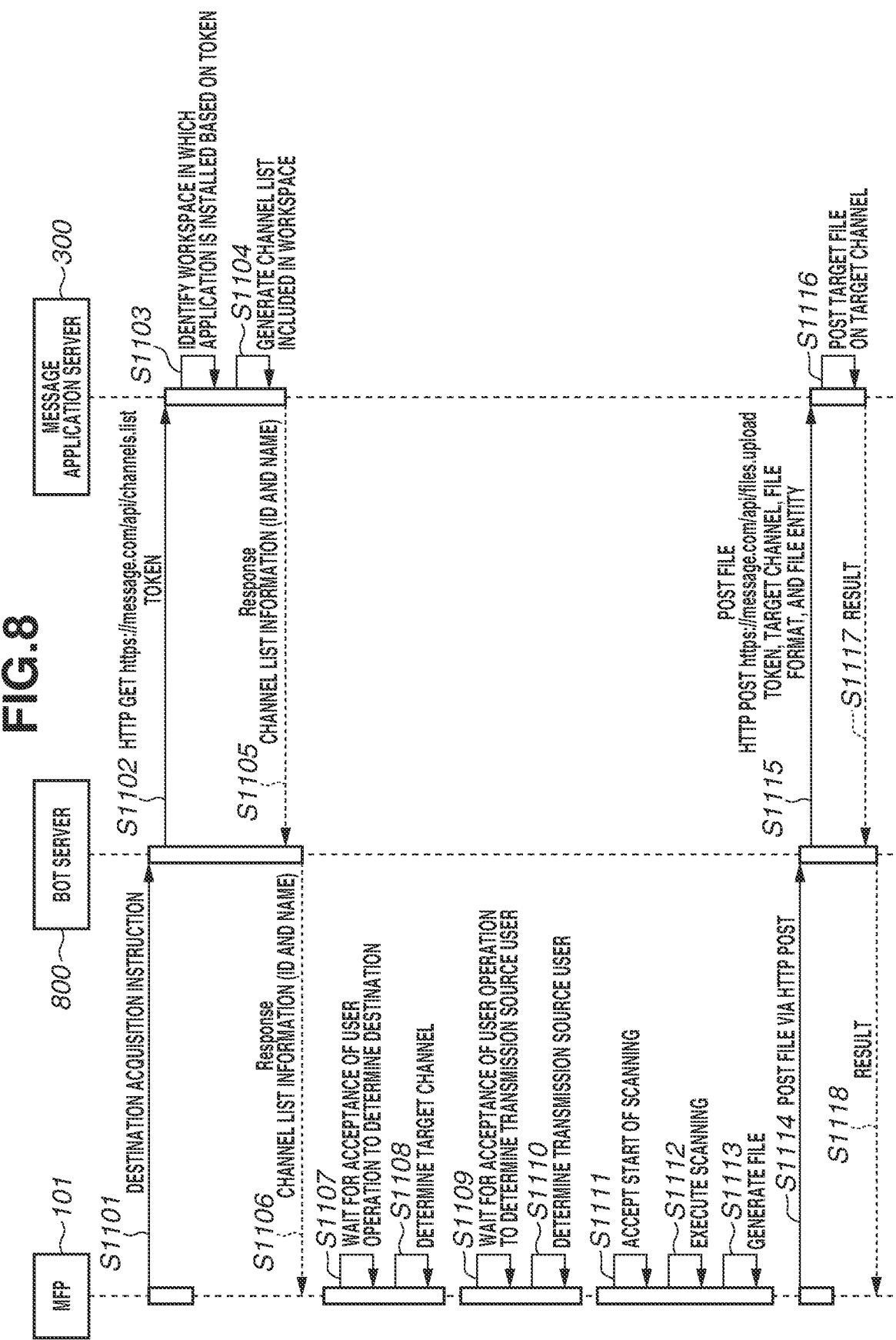
FIG. 8 is a diagram illustrating an example of a sequence of transmitting a file generated by scanning by the MFP to the message application server via the bot server.

FIG. 8 is a diagram illustrating an example of a sequence of transmitting a file generated by scanning by the MFP 101 to the message application server 300 via the bot server 400.

In step S1101, the CPU 111 of the MFP 101 makes a request for channel list information to the bot server 400 via the HTTP communication using a device ID or user ID as a parameter.

In step S1102, the CPU 401 of the bot server 400 transmits to the message application server 300 information indicating the request for the channel list information via the HTTP communication using token information corresponding to the received device ID or user ID. Token information corresponding to the device ID or the user ID received in step S1101 is acquired as the token information.

FIG. 16 is a diagram illustrating an example of correspondence between the ID and the token information. In a table illustrated in FIG. 16, the user ID or the device ID and authentication information (token information) are registered in association with each other. This table is stored in the HDD 405 of the bot server 400. Here, each of the user ID and the device ID is information stored in the MFP 101. The user ID is user-identification information set to each user who uses the MFP 101. The device ID is device-identification information set to each MFP. The user ID is identification information set by the user at the time of generating a user account for logging in to the MFP 101. The device ID is identification information unique to the MFP 101 set at the time of factory shipment.

In step S1103, the CPU 301 of the message application server 300 searches for registered workspace information and a bot application from the token information.

In step S1104, the CPU 301 of the message application server 300 checks whether the executed URL has been permitted based on application information. If the URL has been permitted, the CPU 301 generates channel list information of channels belonging to the workspace. The channel list information is array information of channel information. The channel information includes a channel ID, a channel name, an ID list of members belonging to the channel, and a setting value indicating whether the channel is an archive channel.

In step S1105, the CPU 301 of the message application server 300 controls the communication unit 304 to transmit the channel list information as response information of the HTTP communication to the bot server 400.

In step S1106, the CPU 401 of the bot server 400 transmits the channel list information received in step S1105 as a response of the HTTP communication to the MFP 101.

Since processing in step S1107 to S1113 is similar to the processing in steps S905 to S911 illustrated in FIG. 6, a description thereof is be omitted.

In step S1114, the CPU 111 of the MFP 101 transmits the device ID or the user ID, information indicating the posting destination channel, information indicating a file format or the like, and image data to the bot server 400 via the HTTP communication.

In step S1115, the CPU 401 of the bot server 400 executes processing of transmitting, to the message application server 300, the received information indicating the posting destination channel, the received information indicating the file format, the received image data, and the token information corresponding to the received device ID or user ID. Here, the CPU 401 refers to the table, stored in the HDD 405, in which the device ID or the user ID and the token information are registered in association with each other to determine token information to be transmitted.

Since processing in step S1116 is similar to the processing in step S913, a description thereof is omitted.

In step S1117, the CPU 301 of the message application server 300 transmits a result indicating whether the posting has been successful as response information of the HTTP communication to the bot server 400.

In step S1118, the CPU 401 of the bot server 400 transmits the result indicating whether the posting has been successful as response information of the HTTP communication to the MFP 101. In a case where the posting has been successful, the CPU 111 of the MFP 101 may display a notification that the posting has been successful on the operation unit 116. In a case where the posting has failed, the CPU 111 of the MFP 101 may display a notification that the posting has failed on the operation unit 116. Alternatively, the CPU 111 of the MFP 101 may display the notification that the posting has failed only when the posting has failed without displaying any notification when the posting has been successful.

While the channel list is acquired in the present exemplary embodiment, a limited-access group list, and a user list for individual posting can be posted in a similar manner.

Figure 9:
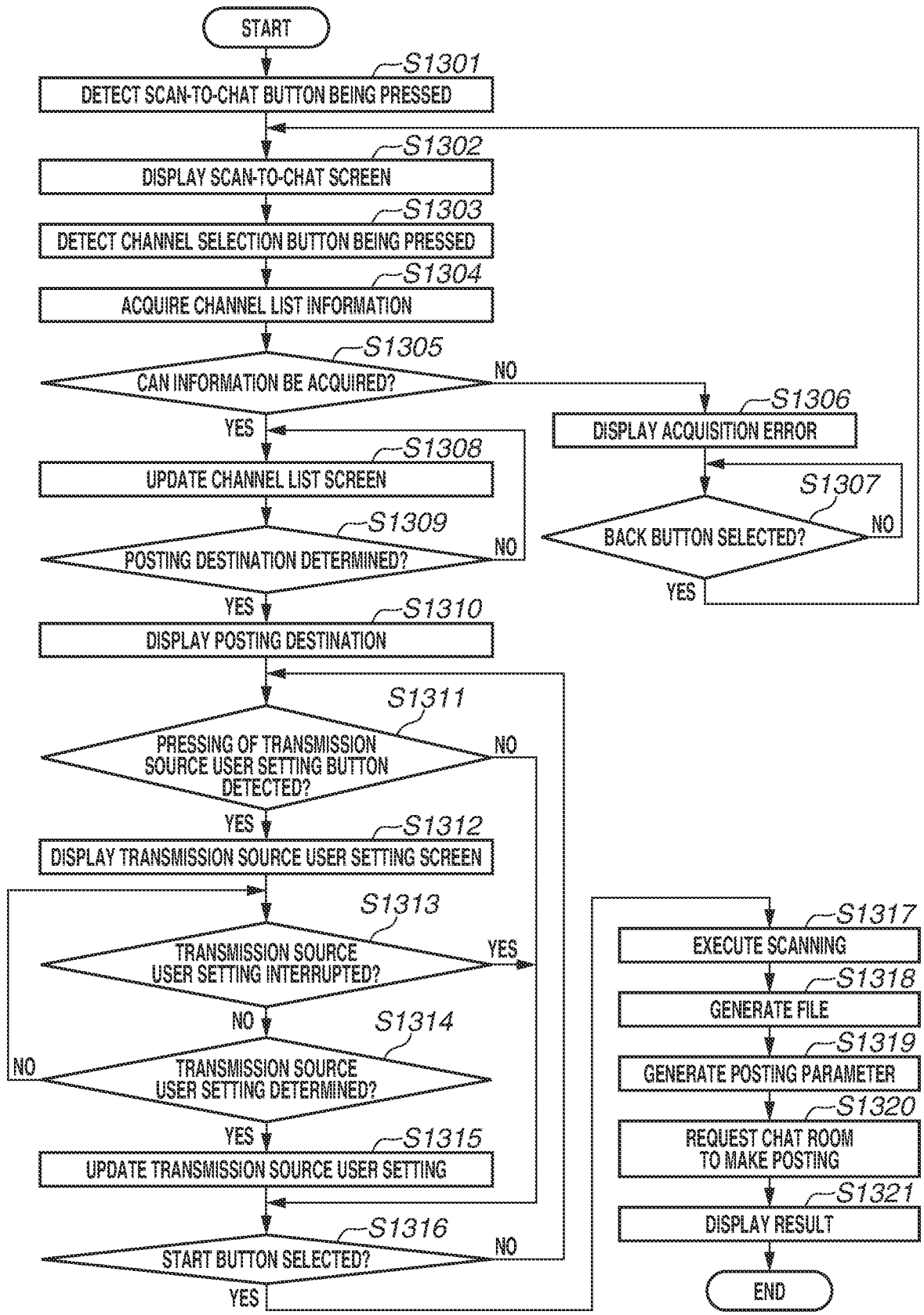
FIG. 9 is a flowchart illustrating an example of the scan-to-chat processing.

FIG. 9 is a flowchart illustrating an example of the scan-to-chat processing. The processing in the flowchart in FIG. 9 is executed by the CPU 111 loading a program stored in the ROM 112 into the RAM 113 and executing the program. The flow of processing in illustrated in FIG. 9 is started when the MFP 101 is powered on.

Since processing in steps S1301 to S1303 is similar to the processing in steps S1001 to S1003, a description thereof is omitted.

In step S1304, the CPU 111 of the MFP 101 acquires the user ID of the logged-in user of the MFP 101 or the device ID of the MFP 101, and transmits a request for acquiring the channel list information and the user ID or the device ID to the bot server 400 via the HTTP communication.

Since processing in steps S1305 to S1319 is similar to the processing in steps S1005 to S1019, a description thereof is omitted.

In step S1320, the CPU 111 transmits the user ID of the logged-in user of the MFP 101 or the device ID of the MFP 101, and the file generated in step S1318 and the posting parameter. While the description has been given of the example in which the file is transmitted to the message application server 300 using the token information 1503 registered in advance according to the first exemplary embodiment, the method is not limited thereto. For example, the storage 114 of the MFP 101 may store therein the user ID or the device ID and the token information in association with each other as illustrated in FIG. 16, and the CPU 111 may transmit the request or the file using the token information corresponding to the user ID of the logged-in user or the device ID.

While the user ID of the logged-in user or the device ID is used for communication with the bot server 400 in the present exemplary embodiment, a tenant ID or other ID may be also used as long as it is a uniquely determined identifier.

Figure 10:
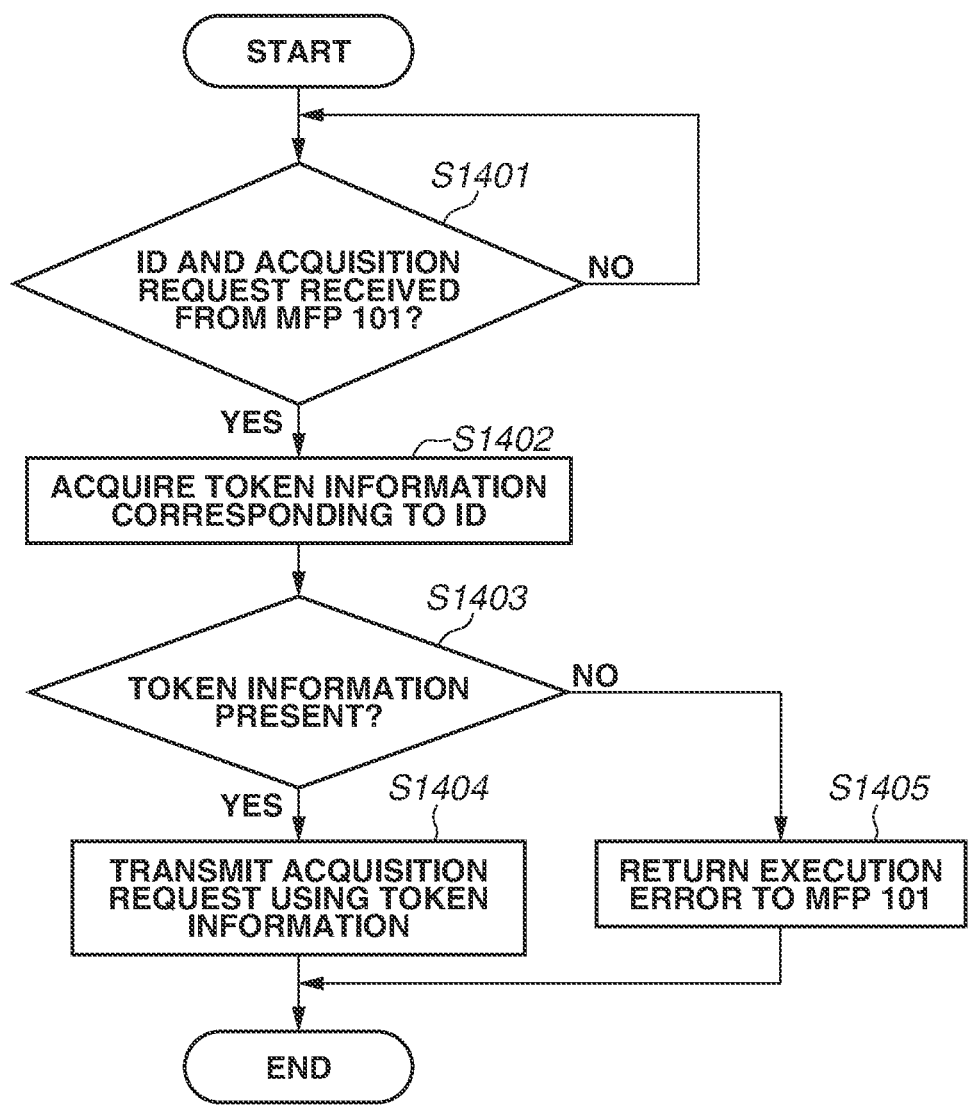
FIG. 10 is a flowchart illustrating an example of processing executed when the bot server transmits image data to the message application server.

FIG. 10 is a flowchart illustrating an example of processing in which the bot server 400 transmits image data to the message application server 300. The processing in the flowchart in FIG. 10 is executed by the CPU 401 loading a program stored in the ROM 112 to the RAM 113 and executing the program. The MFP 101 starts the flow of processing illustrated in FIG. 10 is started when the MFP 101 is powered on.

In step S1401, the CPU 401 determines whether the device ID or the user ID and an information acquisition request for acquiring the channel list information have been received from the MFP 101. In a case where the CPU 111 determines that the device ID or the user ID and the information acquisition request have been received from the MFP 101 (YES in step S1401), the processing proceeds to step S1402. In a case where the CPU 111 determines that the device ID or the user ID and the information acquisition request have not been received from the MFP 101 (NO in step S1401), the processing returns to step S1401.

In step S1402, the CPU 401 acquires token information corresponding to the device ID or the user ID received from the MFP 101.

In step S1403, the CPU 401 determines whether there is token information corresponding to the received device ID or user ID using the table illustrated in FIG. 16. In a case where the CPU 401 determines that there is the token information (YES in step S1403), the processing proceeds to step S1404. In a case where the CPU 401 determines that there is no token information (NO in step S1403), the processing proceeds to step S1405. In the case where the CPU 401 determines there is the token information, the RAM 403 stores therein the token information corresponding to the received device ID or user ID.

In step S1404, the CPU 401 transmits the information acquisition request received from the MFP 101 in step S1401 to the message application server 300 using the token information identified in step S1403. The CPU 401 transmits information that has been returned from the message application server 300 in response to the transmission of the information acquisition request, to the MFP 101.

In step S1405, the CPU 401 transmits information indicating an execution error to the MFP 101 in response to the request received in step S1401.

The description has been given of the flow illustrated in FIG. 10 using the example in which the user ID or the device ID and the information acquisition request transmitted in step S1101 in the sequence illustrated in FIG. 8 are received. Processing similar to that illustrated in FIG. 10 is also executed at the time of receiving the user ID or the device ID, the file (image data), and the posting destination channel information transmitted in the processing in step S1114. That is, when there is the token information corresponding to the received device ID or user ID, the CPU 401 transmits the token information, the posting destination channel information, and the file (image data) to the message application server 300. When there is no token information corresponding to the received device ID or user ID, the CPU 401 transmits information indicating an error to the MFP 101.

Even in a case where an interface specification of the message application server 300 is changed, the present exemplary embodiment can be achieved only by updating a program of the bot server 400 without uploading a program of the MFP 101. In a workplace where there is a plurality of MFPs, it is possible to post a file without making an individual token setting with respect to each of the MFPs.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-027619, filed Feb. 20, 2020, which is hereby incorporated by reference herein in its entirety.

What is claimed is:

1. An image processing apparatus that is able to communicate with a chat server, the image processing apparatus comprising:
   an inputting device that inputs image data based on an image of a document;
   a controller, wherein the controller designates a chat room of a chat service provided by the chat server, and wherein the controller receives selection, by a user, of user information from a plurality of pieces of user information corresponding to a plurality of users included in the designated chat room; and a communicator that transmits, to the chat server, the input image data, account information and the selected user information independent of the account information, wherein, using the account information transmitted by the communicator, the input image data and a message indicating that a transmission source user of the input image data is the user indicated by the selected user information are posted to the designated chat room.

2. The image processing apparatus according to claim 1, wherein the controller generates, without input of the selected user information as the message by the user, the message indicating that the transmission source user of the input image data is the user indicated by the selected user information, and wherein the communicator transmits the input image data, the generated message and the account information to the chat server.

3. The image processing apparatus according to claim 2, wherein the communicator transmits information indicating the chat room, the selected user information, the account information and the input image data.

4. The image processing apparatus according to claim 1, wherein the inputting device is a scanner, and wherein the image data is input by scan of the document by the scanner.

5. The image processing apparatus according to claim 1, wherein the plurality of pieces of user information are information received from the chat server.

6. The image processing apparatus according to claim 1, further comprising:

a display that displays the plurality of pieces of user information corresponding to the plurality of users included in the chat room designated by the controller, wherein the controller receives the selection of the user information from the plurality of pieces of user information displayed by the display, and wherein the display does not display user information not corresponding to a user included the chat room designated by the controller.

7. The image processing apparatus according to claim 1, wherein the controller designates a user to be mentioned based on designation of the chat room.

8. The image processing apparatus according to claim 1, wherein the communicator, in response to input of the image data by the inputting device, transmits the input image data, the account information and the selected user information to the chat server.

9. The image processing apparatus according to claim 1, wherein the controller sets information for communication with the chat server, and wherein the communicator transmits the input image data, the account information and the selected user information to the chat server using the information for communication with the chat server.

10. The image processing apparatus according to claim 9, wherein the information for communication with the chat server is a uniform resource locator (URL).

11. The image processing apparatus according to claim 1, wherein the communicator transmits the input image data via hypertext transfer protocol (HTTP) communication.

12. An image processing method comprising:

inputting image data based on an image of a document;

designating a chat room of a chat service provided by a chat server;

receiving selection, by a user, of user information from a plurality of pieces of user information corresponding to a plurality of users included in the designated chat room; and transmitting the input image data, account information and the selected user information independent of the account information to the chat server, wherein, using the transmitted account information, the input image data and a message indicating that a transmission source user of the input image data is the user indicated by the selected user information are posted to the designated chat room.

13. The image processing method according to claim 12, further comprising:

generating, without input of the selected user information as the message by the user, the message indicating that the transmission source user of the input image data is the user indicated by the selected user information, wherein the input image data, the generated message and the account information are transmitted to the chat server.

14. The image processing method according to claim 13, wherein the information indicating the chat room, the selected user information, the account information and the input image data are transmitted based on the received instruction.

15. The image processing method according to claim 12, wherein the image data is input by scan of the document.

16. The image processing method according to claim 12, wherein the plurality of pieces of user information are information received from the chat server.

17. The image processing method according to claim 2, further comprising:

displaying the plurality of pieces of user information corresponding to the plurality of users included in the designated chat room, wherein the user information is selected from the plurality of pieces of displayed user information, and wherein user information not corresponding to a user included the designated chat room is not displayed.

18. The image processing method according to claim 12, wherein a user to be mentioned is designated based on designation of the chat room.

19. The image processing method according to claim 12, wherein, in response to input of the image data, the input image data, the account information and the selected user information are transmitted to the chat server.

20. The image processing method according to claim 12, further comprising setting information for communication with the chat server, wherein the input image data, the account information and the selected user information are transmitted to the chat server using the information for communication with the chat server.

21. The image processing method according to claim 20, wherein the information for communication with the chat server is a URL.

22. The image processing method according to claim 12, wherein the input image data is transmitted via HTTP communication.

23. A non-transitory computer-readable storage medium storing a program that, when executed by a computer, causes the computer to perform an image processing method, the image processing method comprising:

inputting image data based on an image of a document;

designating a chat room of a chat service provided by a chat server;

receiving selection, by a user, of user information from a plurality of pieces of user information corresponding to a plurality of users included in the designated chat room; and transmitting the input image data, account information and the selected user information independent of the account information to the chat server, wherein, using the transmitted account information, the input image data and a message indicating that a transmission source user of the input image data is the user indicated by the selected user information are posted to the designated chat room.

* * * * *